US011097519B2

(12) United States Patent
Reinicke et al.

(10) Patent No.: US 11,097,519 B2
(45) Date of Patent: *Aug. 24, 2021

(54) POLYAMIDE-BASED SURFACE MATERIAL WITH FILLERS FOR SLIDING ELEMENT

(71) Applicant: KS Gleitlager GmbH, St. Leon-Rot (DE)

(72) Inventors: Rolf Reinicke, Bad Schoenborn (DE); Ruediger Bickle, Reilingen (DE); Steffen Dick, Kaiserslautern (DE)

(73) Assignee: KS Gleitlager GmbH, St. Leon-Rot (DE)

( * ) Notice: Subject to any disclaimer, the term of this patent is extended or adjusted under 35 U.S.C. 154(b) by 218 days.

This patent is subject to a terminal disclaimer.

(21) Appl. No.: 16/462,770

(22) PCT Filed: Nov. 22, 2017

(86) PCT No.: PCT/EP2017/080102
§ 371 (c)(1),
(2) Date: May 21, 2019

(87) PCT Pub. No.: WO2018/095986
PCT Pub. Date: May 31, 2018

(65) Prior Publication Data
US 2019/0367729 A1  Dec. 5, 2019

(30) Foreign Application Priority Data

Nov. 22, 2016 (DE) ..................... 10 2016 122 475.8
Nov. 22, 2016 (DE) ..................... 10 2016 122 476.6
Sep. 19, 2017 (DE) ..................... 10 2017 121 725.8

(51) Int. Cl.
| | |
|---|---|
| *B32B 27/34* | (2006.01) |
| *C10M 169/04* | (2006.01) |
| *C10N 40/02* | (2006.01) |
| *C10N 40/32* | (2006.01) |
| *B32B 27/20* | (2006.01) |
| *C10N 50/00* | (2006.01) |
| *C10N 40/00* | (2006.01) |
| *C10N 40/04* | (2006.01) |

(52) U.S. Cl.
CPC .............. *B32B 27/20* (2013.01); *B32B 27/34* (2013.01); *C10M 169/04* (2013.01); *C10M 2201/065* (2013.01); *C10M 2201/066* (2013.01); *C10M 2201/085* (2013.01); *C10M 2217/0443* (2013.01); *C10N 2040/02* (2013.01); *C10N 2040/04* (2013.01); *C10N 2040/32* (2013.01); *C10N 2040/38* (2020.05); *C10N 2050/14* (2020.05)

(58) Field of Classification Search
CPC ...... B32B 27/20; B32B 27/34; C10M 169/04; C10M 2201/065; C10M 2201/085; C10M 2217/0443; C10M 2201/041; C10M 2201/05; C10M 2201/061; C10M 2201/062; C10M 2201/066; C10M 2201/081; C10M 2201/103; C10N 2030/06; C10N 2040/02; C10N 2040/04; C10N 2040/38; C10N 2040/32; C10N 2050/025; C10N 2050/14
See application file for complete search history.

(56) References Cited

U.S. PATENT DOCUMENTS

| | | |
|---|---|---|
| 2008/0312357 A1 | 12/2008 | Tanaka et al. |
| 2011/0082059 A1 | 4/2011 | Iwata |
| 2013/0337271 A1 | 12/2013 | Yoshikawa et al. |
| 2014/0106914 A1 | 4/2014 | Proost et al. |

FOREIGN PATENT DOCUMENTS

| | | |
|---|---|---|
| DE | 10301135 A1 | 7/2004 |
| DE | 102008026519 A1 | 12/2008 |
| DE | 102011077008 A1 | 12/2012 |
| DE | 102013021949 A1 | 7/2015 |
| EP | 2677021 A1 | 12/2013 |
| WO | 2012146325 A1 | 11/2012 |
| WO | 2012111774 A1 | 7/2014 |

OTHER PUBLICATIONS

International Search Report and Written Opinion from PCT/EP2017/08012 dated Mar. 13, 2018.
German Examination Report from priority application dated Jul. 20, 2017.
German Examination Report from priority application dated Aug. 17, 2017.
German Preliminary Examination report dated Oct. 22, 2018.
German Preliminary Examination Report dated Jan. 4, 2019.

*Primary Examiner* — John D Freeman
(74) *Attorney, Agent, or Firm* — Dilworth & Barrese, LLP

(57) ABSTRACT

The invention relates to a polyamide-based surface material having fillers which improve the tribologically active properties, wherein the fillers comprise at least one metal sulfide and/or calcium phosphate. The invention further relates to a three-dimensional molded body consisting of a surface material, produced, in particular, as an injection-molded part or extrusion part and or by additive fabrication.

16 Claims, 1 Drawing Sheet

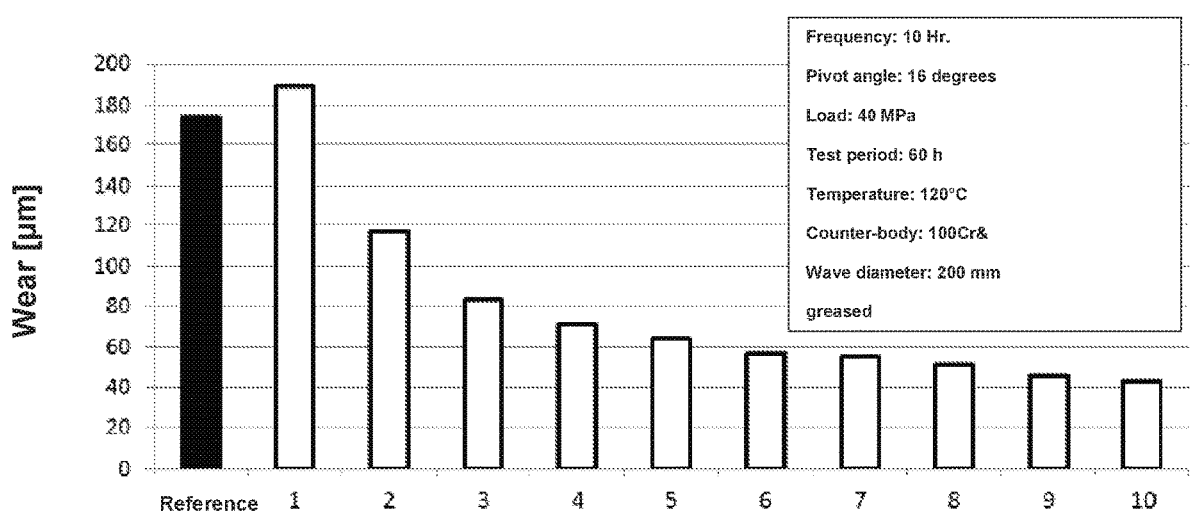

POLYAMIDE-BASED SURFACE MATERIAL WITH FILLERS FOR SLIDING ELEMENT

This application claims priority to each of German Patent Application No. 102016122476.6 filed on Nov. 22, 2016, German Patent Application No. 102916122475.8 filed on Nov. 22, 2016 and German Patent Application No. 10207121725.8 filed on Sep. 19, 2017, the contents of each of which are incorporated by reference herein in their entireties.

The invention relates to a polyamide-based surface material having fillers, which improve the tribologic properties and, in particular, wear properties.

In addition to other applications, such as gears and transmission components, surface materials are also used as sliding materials, for example, in slide bearings.

Surface materials in the form of sliding materials, which use polyamide, are known in the prior art. Thus, for example, unfilled polyamide 4.6 is used, however it is not wear-resistant enough for critical applications in the commercial vehicle sector.

A multitude of additional sliding materials is also known that are based on PTFE, for example, and use polyamide merely as a filler.

Something similar to this is described in DE 10 2011 077 008 A1, for example, which describes a PTFE-based slide bearing composite material, in which fillers are present comprising thermoplasts and/or duroplasts and additional tribologically active substances together in compounded form in the polymer base of the slide bearing material.

The subject matter of DE 10 2013 021 949 A1 is the use of polyamides as solid lubricants in solvent-free water-based polyamide-imide lubricating varnishes.

In addition to the use as a classic sliding material, there is an additional field of application for such surface materials for transmission components, as well as for gears, which are subject to significant wear due to the frictional or rolling contact with a counterpart.

Based on this prior art, it was the object of the invention to improve the tribological properties and, in particular, the wear resistance of polyamide-based surface materials.

This object is achieved by a polyamide-based surface, material having fillers that improve the tribolobical properties, in which the fillers comprise one or multiple metal sulfides and/or calcium phosphate.

The invention also relates to molded bodies and to objects made of or having the surface material according to the invention.

It was found unexpectedly in this case that the addition of one or multiple metal sulfides and/or calcium phosphate to the polyamide base significantly improves the wear resistance of the surface material. The present surface material is suited in this case, in particular, for uses outside the engine in the automotive sector, in particular, in grease-lubricated systems, such as transmission components, gears, commercial vehicle brake systems, stub axle bearing arrangements, etc. The desire in the case of such applications is to use lead-free surface materials. The present surface material now provides a material that exhibits a sufficient wear resistance.

The polymer base used in the surface material according to the invention is a polyamide base. This does not necessarily mean that the entire polymer base must consist of up to 100% of polyamide. Proportions up to 30% by weight of the polymer portion, in particular, up to 20% by weight and preferably only up to 10% by weight of the polyamide base may be replaced by other polymers and combinations thereof such as, in particular, PTFE, but also, for example, PVDF, PFA, FEP, ECTFE, ETFE. Preferably, the entire polyamide base consists of up to 100% by weight of polyamide.

According to one particularly preferred embodiment, it is provided that the polyamide base comprises PA 4.6 and, in particular, consists of up to at least 60% by weight, in particular, up to at least 70% by weight, in particular, up to at least 80% by weight, in particular, at least up to 90% by weight and, in particular, up to 100% by weight of PA 4.6.

Additional polyamides differing from PA 4.6, in particular, PA 6 and/or PA 6.6 may also be used for further improving the properties of the surface material, in particular, for improved compoundability of the materials, between 0% by weight and 40% by weight, in particular, 1% by weight to 30% by weight and, in particular, 5% by weight to 20% by weight of the polyamide base.

Particularly advantageous properties result if the proportion of the one or multiple metal sulfides and/or of calcium phosphate in total is 1% by weight to 30% by weight, in particular, 1% by weight to 20% by weight and, in particular, 5% by weight to 15% by weight, in particular, 10% by weight of the surface material. Depending on the specific selection of fillers, it may also be particularly preferred if the proportion of calcium phosphate and/or metal sulfides is 5% by weight or 10% by weight, in each case relative to the surface material.

In this case, it is particularly preferred if both the at least one metal sulfide as well as calcium phosphate are used. In this case, the proportion of the at least one metal sulfide is preferably 1 to 50% by weight and of calcium phosphate 50 to 99% by weight of the mixture of metal sulfide and calcium phosphate. The proportion of metal sulfide is, in particular, 3 to 40% by weight and of calcium phosphate from 60 to 97% by weight. Furthermore, the proportion of metal sulfide is, in particular, 5 to 30% by weight and of calcium phosphate from 70 to 95% by weight.

Mixtures of calcium phosphate and/or of one or multiple metal sulfides, in particular, $MoS_2$, $SnS_2$, $WS_2$ or bismuth sulfide and combinations of the aforementioned may be particularly preferably used.

Also particularly preferred is the use of $WS_2$ without the addition of calcium phosphate.

Fillers having the following composition have proven to be particularly preferred:
 2-20% by weight $SnS_2$,
 70-97% by weight calcium phosphate
 1-10% by weight $WS_2$.

In this case, the weight specifications relate to the total of the weights of the three fillers. The total of the proportions equals 100% by weight. Up to 1% by weight to 30% by weight, in particular, 1% by weight to 20% by weight and in particular, 5% by weight up to 15% by weight, in particular, 10% by weight of this composition relative to the weight of the surface material may then be used in the surface material. Depending on the specific selection of fillers, it may also be particularly preferred if the proportion of calcium phosphate and/or metal sulfides is 5% by weight relative to the weight of the surface material.

Another particular preferred composition of fillers is
 50% by weight calcium phosphate
 50% by weight $WS_2$
relative to the total of the weights of the two fillers of the composition.

Weight ratios of calcium phosphate to metal sulfide in this case of 5:1 to 1:1 are particularly preferred.

Preferred proportions for a preferred composition of the fillers of $SnS_2$/calcium phosphate/$WS_2$ (in each case mass percentages relative to the mass percentage of $WS_2$) are as follows:

1-3 $SnS_2$,
9-13 calcium phosphate
1 $WS_2$,
and, in particular,
1,67 $SnS_2$,
11 calcium phosphate
1 $WS_2$.

Alternatively, calcium phosphate and $WS_2$ in a mass ratio of 1:1 are also particularly preferred as fillers.

Such filler compositions offer particularly good tribological properties in such surface materials, which positively influence, in particular, the wear properties of, for example, slide bearings, slide guides, but also of transmission parts or also gears, as well as transport chains and cable guides and chain guides.

The fillers may advantageously also have the following composition relative to the weight of the surface material: 5% by weight calcium phosphate and 5% by weight $WS_2$.

Further, it may also be advantageous to use only metal sulfides, in particular $WS_2$, as filler, in particular in a proportion of 10% by weight relative to the surface material.

Furthermore, the fillers may also comprise additional tribologically active substances, for example, reinforcing materials, such as, in particular, carbon fibers, glass fibers, polymer fibers (in particular, aramide fibers); and/or solid lubricants, such as, in particular, PTFE, ZnS, $BaSO_4$, graphite, carbon black, BN and/or plastic particles, such as, in particular, aramide (PPTA) particles, $PPSO_2$ particles, PI particles and PAI particles, polyacrylate particles (PAR), PBA particles, PBI particles; and/or metal oxides, such as, in particular, $Fe_2O_3$, $Al_2O_3$, $SiO_2$, $CrO_2$, $TiO_2$, CuO, MgO, ZnO; and/or hard material products, in particular, ceramic particles, such as SiC, $Si_3N_4$, BC, cubic BN; and/or fluorides, such as, in particular, $CaF_2$, NaF, $AlF_3$; and/or layer silicates, such as, in particular, kaolin, mica, wollastonite, talc, precipitated chalk, silica; and/or metallic fine powder, such as, in particular bronze and bismuth; and/or pigments or mixed phase oxide pigments, such as, in particular, Co—Al, Cr—Sb—Ti, Co—Ti, Fe—Al or Co—Cr.

In this case, it is particularly preferred if the proportion of the additional tribologically active materials is 0% by weight to 40% by weight, in particular, 1% by weight to 20% by weight, in particular, 1% by weight to 10% by weight, in particular, 5% by weight of the surface material.

The use of layer silicates, in particular, kaolin and/or wollastonite and/or talc, and/or solid lubricants, in particular, $BaSo_4$ and/or ZnS, is particularly preferred in this case.

It is further particularly preferably provided that the polyamide base forms 50% to 95% by weight, in particular, 60% by weight to 95% by weight and, in particular, 70% by weight to 90% by weight of the surface material. In this way the properties of the polyamide material are able to sufficiently influence the surface material.

The surface material in this case may be used for producing a slide bearing composite material having a metallic support layer, in particular, of steel or bronze, optionally having a porous carrier layer, in particular, of bronze and having a surface material of the type described above which fills the pores and is used as a sliding material. For this purpose, the surface material is extruded with its fillers into a foil-like flat material and this flat material is applied to a metallic support layer, or impregnated into the pores of the porous carrier layer, for which purpose a hot pressing process and/or a rolling process is preferably used.

In addition, the invention also comprises a three-dimensional molded body consisting of or having a surface material of the type described above, which is produced, in particular, as an injection-molded part or extrusion part. The molded body may also be joined, in particular injection molded, to a carrier part made of another material. However, mechanical or other types of materially bonding connections are also conceivable. Additive fabrication processes, with which the molded body may be produced are also conceivable. The molded body may be designed or used as a slide bearing element, but also as a transmission component or, for example, as a gear.

In this case, the dimensions of the molded body are at least 1 mm, in particular, at least 2 mm and more particularly, at least 5 mm or at least 6 mm in each dimension. On the other hand, the dimensions may, of course, be much greater.

The slide bearing composite material formed with the surface material or the three-dimensional molded body formed with the surface material may be used as slide bearing elements, wherein a slide bearing element may, for example, be a slide bar, a slide shoe, a slide pad as well as a slide bearing shell, a slide bearing bushing or a slide bearing collar bushing. The dimensions of the molded body in a slide shoe or a slide bar are at least 1 mm, in particular, at least 2 mm and more particularly, at least 5 mm or at least 6 mm in each dimension. On the other hand, the dimensions may, of course, be much greater. Shell molds such as, in particular, spherical shell molds, bushings or collar bushings as well as other components are, in principle, also conceivable in the use of molded bodies.

Slide elements may also be typically rolled cylindrical bushings or half shell-shaped slide bearing elements, which are produced using the slide bearing composite material. The slide bearing composite material may also be used for producing collar bushings or cup bushings or planar and spherical slide bearing elements.

Examples of a surface material serving as a sliding material are indicated in the table below. The wear values are shown in FIG. 1.

|  | Example No. | | | | | |
| --- | --- | --- | --- | --- | --- | --- |
|  | Reference | 1 | 2 | 3 | 4 | 5 |
| Polyamide base | 100% by weight PA 4.6 | 80% by weight PA 4.6 10% by weight PA 6.6 | 85% by weight PA 4.6 7.5% by weight PTFE | 80% by weight PA 4.6 10% by weight PA 6.6 | 80% by weight PA 4.6 10% by weight PA 6.6 | 75% by weight PA 4.6 15% by weight PA 6.6 5% by weight PTFE |
| Fillers | — | — | — | 10% by | 10% by | 5% by weight |

-continued

|  |  |  |  | weight WS$_2$ | weight mixture A | mixture A |
|---|---|---|---|---|---|---|
| Additional tribologically active materials | — | 10% by weight kaolin | 7.5% by weight kaolin | — | — |  |
| Wear | 174 | 189 | 117 | 83 | 71 | 64 |

|  | Example No. | | | | |
|---|---|---|---|---|---|
|  | 6 | 7 | 8 | 9 | 10 |
| Polyamide base | 80% by weight PA 4.6<br>10% by weight PA 6.6 | 80% by weight PA 4.6<br>10% by weight PA 6.6 | 80% by weight PA 4.6<br>10% by weight PA 6.6 | 70% by weight PA 4.6<br>15% by weight PA 6.6<br>5% by weight PTFE | 70% by weight PA 4.6<br>15% by weight PA 6.6<br>5% by weight PTFE |
| Fillers | 5% by weight calcium phosphate<br>5% by weight WS$_2$ | 5% by weight mixture A | 5% by weight mixture A | 5% by weight mixture A | 5% by weight mixture A |
| Additional tribologically active materials |  | 5% by weight barium sulfate | 5% by weight zinc sulfide | 5% by weight kaolin | 5% by weight talc |
| Wear | 57 | 55 | 51 | 46 | 43 |

Mixture A: 1.67 parts SnS$_2$
11 parts calcium phosphate
1 part WS$_2$

The wear values in μm are plotted in the following FIG. 1, together with the parameters of the measurement:

It may be seen from FIG. 1 that the addition of fillers of the mixture A or the addition of calcium phosphate, together with WS$_2$ or the addition of WS$_2$ alone as an exemplary metal sulfide lowers the wear values significantly and thereby improves the wear resistance.

Examples 3 through 10 depicted above represent preferred compositions of the surface material according to the invention, wherein the polyamide base is formed from two different polyamides with emphasis on PA 4.6 and, in part, PTFE, and to which parts of 5% by weight or 10% by weight of a mixture A of tin disulfide, calcium phosphate and tungsten disulfide in a ratio of 5:33:3% by weight have been added and, in part, an additional tribologically active material such as, for example, 5% by weight of barium sulfate, tin sulfide, kaolin or talc in Examples 7-10. An alternative composition of the fillers is shown in Examples 3 and 6. Examples 1 through 2 are comparison examples. A surface material made of PA 4.6 with no fillers and no additional components serves as a reference.

The invention claimed is:

1. A polyamide-based surface material comprising fillers which improve the tribologic properties, wherein the fillers comprise at least one metal sulfide and calcium phosphate wherein the at least one metal sulfide is a combination of SnS$_2$ and WS$_2$ and wherein SnS$_2$ and WS$_2$ and calcium phosphate having the following composition
   2-20% by weight SnS$_2$;
   70-97% by weight calcium phosphate; and,
   1-10% by weight WS$_2$,
      wherein the total of these proportions equals to 100% by weight of SnS$_2$ and WS$_2$ and calcium phosphate.

2. The polyamide-based surface material of claim 1, wherein the polyamide base of the polyamide-based surface material comprises at least 70% by weight of polyamide.

3. The polyamide-based surface material of claim 1, wherein the polyamide base of the polyamide-based surface material comprises PA 4.6.

4. The polyamide-based surface material of claim 3, wherein the polyamide base of the polyamide-based surface material further comprises 1-40% by weight a further polyamide which is different from PA 4.6.

5. The polyamide-based surface material of claim 1, wherein the proportion of the SnS$_2$ and WS$_2$ and calcium phosphate in total is 1-30% by weight of the of the polyamide-based surface material.

6. The polyamide-based surface material of claim 1, further comprising additional tribologically active materials.

7. The polyamide-based surface material of claim 6, wherein the additional tribologically active materials are present in an amount of from 1-40% by weight based on the weight of the polyamide-based surface material.

8. The polyamide-based surface material of claim 6, wherein the additional tribologically active materials are present in an amount of from 1-20% by weight based on the total weight of the polyamide-based surface material.

9. The polyamide-based surface material of claim 1, wherein the polyamide base comprises 50-95% by weight of the polyamide-based surface material.

10. A slide bearing composite material comprising a metallic support layer, and the polyamide-based surface material of claim 1.

11. A three-dimensional molded body for sliding stress comprising the polyamide-based surface material of claim 1.

12. A slide element comprising the slide bearing composite material of claim 10.

13. The slide element of claim 12, which is selected from the group consisting of a slide bar, a slide shoe, a slide pad, a slide bearing shell, a slide bearing bushing, and a slide bearing collar bushing.

14. A slide element comprising the three-dimensional molded body of claim 11.

15. The slide element of claim 14, which is selected from the group consisting of a gear, a transmission component, a cable guide, a chain guide, and a transport chain.

16. A polyamide-based surface material comprising fillers which improve the tribologic properties, wherein the fillers comprise at least one metal sulfide and calcium phosphate wherein the at least one metal sulfide is a combination of $SnS_2$ and $WS_2$ and wherein $SnS_2$ and $WS_2$ and calcium phosphate are comprised in the weight ratios of 1-3 $SnS_2$ to
9-13 calcium phosphate to
1 $WS_2$.

* * * * *